US011826835B2

(12) United States Patent
Schmida et al.

(10) Patent No.: US 11,826,835 B2
(45) Date of Patent: Nov. 28, 2023

(54) DRILLING TOOL

(71) Applicant: Hartmetall-Werkzeugfabrik Paul Horn GmbH, Tuebingen (DE)

(72) Inventors: Peter Paul Schmida, Muenster (AT); Manfred Josef Schwaiger, Radstadt (AT)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 17/125,565

(22) Filed: Dec. 17, 2020

(65) Prior Publication Data

US 2021/0129231 A1 May 6, 2021

Related U.S. Application Data

(63) Continuation of application No. PCT/EP2019/071284, filed on Aug. 8, 2019.

(30) Foreign Application Priority Data

Aug. 9, 2018 (DE) ..................... 10 2018 119 445.5

(51) Int. Cl.
*B23B 51/04* (2006.01)
*B23B 27/16* (2006.01)
(52) U.S. Cl.
CPC .................... *B23B 27/16* (2013.01)
(58) Field of Classification Search
CPC . B23B 27/16; B23B 2251/14; B23B 2251/18; B23B 51/0493; B23B 51/00
See application file for complete search history.

(56) References Cited

U.S. PATENT DOCUMENTS 3,811,163 A * 5/1974 Frederick .................. B23C 5/06
407/54
4,124,328 A * 11/1978 Hopkins ............... B23B 27/141
408/199

(Continued)

FOREIGN PATENT DOCUMENTS

CH 693203 A5 * 4/2003 ......... B23B 51/0493
CN 1223607 A 7/1999

(Continued)

OTHER PUBLICATIONS

Machine Translation of DE 19710995 A1 (DE'197110995 was cited on IDS by Applicant) (Year: 2023).*

(Continued)

*Primary Examiner* — Nicole N Ramos
(74) *Attorney, Agent, or Firm* — Jason H. Vick; Sheridan Ross, PC

(57) ABSTRACT

A drilling tool comprising a tool holder that extends along a central axis and comprises a first cutting insert receptacle having a first abutment surface oriented parallel to the central axis. The drilling tool further comprises a first cutting insert that is fixed in the first cutting insert receptacle and abuts with one of its sides against the first abutment surface, wherein an axial portion of the first cutting insert projects axially beyond an end face end of the tool holder, and wherein the first cutting insert comprises in the axial portion a first main cutting edge that is inclined with respect to a first imaginary plane, which is oriented orthogonally to the central axis and arranged at the end face end of the tool holder, so that a radially outer end of the first main cutting edge is spaced a larger distance from the first imaginary plane than a radially inner end of the first main cutting edge and the first main cutting edge does not intersect the first imaginary plane, and wherein the first main cutting edge (Continued)

touches or intersects a second imaginary plane that is spanned by the central axis and oriented orthogonally to the first abutment surface.

19 Claims, 4 Drawing Sheets

(56) References Cited

U.S. PATENT DOCUMENTS

| | | | |
|---|---|---|---|
| 4,265,574 A | 5/1981 | Eckle | |
| 4,367,991 A | 1/1983 | Gräfe et al. | |
| 4,563,113 A * | 1/1986 | Ebenhoch | B23B 51/00 408/199 |
| 4,565,471 A * | 1/1986 | Negishi | B23B 51/02 408/207 |
| 5,667,344 A | 9/1997 | Simpson et al. | |
| 5,807,032 A | 9/1998 | Abe | |
| 6,000,887 A * | 12/1999 | Hoefler | B23B 51/0493 408/229 |
| 6,616,387 B2 * | 9/2003 | Schneider | B23B 51/00 407/53 |
| 8,388,278 B2 | 3/2013 | Nasu et al. | |
| 9,976,231 B2 | 5/2018 | Zhan, II et al. | |
| 2004/0184894 A1* | 9/2004 | Kraemer | B23B 51/00035 408/227 |
| 2009/0245949 A1 | 10/2009 | Takahashi et al. | |
| 2010/0034606 A1* | 2/2010 | Nasu | B23B 51/00 408/230 |
| 2011/0176878 A1* | 7/2011 | Nomura | C23C 16/00 228/159 |
| 2011/0229281 A1* | 9/2011 | Kim | B23B 51/00 408/229 |

FOREIGN PATENT DOCUMENTS

| | | |
|---|---|---|
| CN | 102216009 A | 10/2011 |
| DE | 2555979 A1 | 6/1977 |
| DE | 2834083 A1 | 2/1980 |
| DE | 19710995 A1 | 9/1998 |
| DE | 19710997 A1 * | 9/1998 ......... B23B 27/1651 |
| EP | 2098319 A1 | 9/2009 |
| GB | 1562229 A | 3/1980 |
| JP | S54-69888 A | 6/1979 |
| JP | S54-116795 A | 9/1979 |
| JP | H07-251301 A | 10/1995 |
| JP | 2001-150219 A | 6/2001 |
| JP | 2006-192553 A | 7/2006 |
| JP | 2008-178967 A | 8/2008 |
| RU | 2638220 C2 | 12/2017 |
| SU | 88320 A1 | 10/1950 |
| SU | 965628 A1 | 10/1982 |
| SU | 1346352 A1 | 10/1987 |
| WO | WO 03/068437 A1 | 8/2003 |
| WO | WO 2017/059466 | 4/2017 |

OTHER PUBLICATIONS

Machine Translation of CH 693203 A5 (Year: 2023).*
Official translation of CH 693 203 A5 (Year: 2023).*
Official translation of DE 197 10 995 A1 (Year: 2023).*
International Search Report for International Application No. PCT/EP2019/071284, dated Oct. 29, 2019.
Written Opinion for International Application No. PCT/EP2019/071284, dated Oct. 29, 2019.
Translation of Decision to Grant a Patent Invention for corresponding Russian Application No. 2020139783/05(073954), dated May 27, 2021.
International Preliminary Report on Patentability for International Application No. PCT/EP2019/071284, dated Feb. 18, 2021.
Notification of Reasons for Rejection (Including Translation) for corresponding Japanese Patent Application No. 2021-504433, dated Feb. 22, 2022.
Notification of Reasons for Rejection (Including Translation) for corresponding Japanese Patent Application No. 2021-504433, dated Aug. 16, 2022.
First Office Action (Including Translation) for corresponding Chinese Patent Application No. 201980043867.6, dated Dec. 19, 2022.
Notification of Reasons for Rejection (Including Translation) for corresponding Japanese Patent Application No. 2021-504433, dated May. 16, 2023.

* cited by examiner

DRILLING TOOL

CROSS REFERENCE TO RELATED APPLICATIONS

This application is a continuation of international patent application PCT/EP2019/071284, filed on Aug. 8, 2019 designating the U.S., which international patent application has been published in German language and claims priority from German patent application DE 10 2018 119 445.5, filed on Aug. 9, 2018. The entire contents of these priority applications are incorporated herein by reference.

BACKGROUND

This disclosure relates to a drilling tool.

The herein presented drilling tool is particularly suitable for machining sintered cemented carbide or ceramics. However, the use of the drilling tool is not limited to the machining of workpieces made of such materials, although this is the preferred application.

Sintered cemented carbide has a very high hardness. In addition to its use as a cutting material, sintered cemented carbide is often used in forming technology as a punch, hammer or as a wear part. The machining of such components made of sintered cemented carbide is traditionally mainly done by grinding and eroding. Milling tools are also known whose cutting edges are made of cemented carbide coated with a diamond layer. However, drills suitable for machining sintered cemented carbide are hard to find.

The production of through holes or blind holes in workpieces made of sintered cemented carbide often proves to be extremely complicated in practice due to the very high hardness of this material. Especially when a thread is to be cut in such holes/bores, the use of tools with very precise and at the same time very stable cutting edges of extremely high hardness is absolutely necessary. This is virtually impossible with the previously known eroding processes. Only with diamond-coated cemented carbide milling tool has this been possible so far. However, the service life of such diamond-coated cemented carbide milling tools is very short, so that the use of such milling tools has proven to be cost-intensive.

Drilling of sintered cemented carbide with conventional drills has not been possible up to now, especially for the following reasons: In addition to the lack of strength and stability of the previously known drilling tools, the extreme heat development during the machining of sintered cemented carbide is a main obstacle. In addition, when using conventional drilling tools, too much pressure would be built up in the center of the drill, as the cutting speed of the drill is typically zero here, because the cutting process starts from the center or tip of the drill, around which the drill rotates, and proceeds from the inside outwards. For the machining of sintered cemented carbide by drilling, drilling tools with specially adapted cutting edge geometries would therefore be required.

SUMMARY

It is tan object to provide a drilling tool that overcomes the problems mentioned above and is particularly suitable for machining sintered cemented carbide and ceramics.

According to a first aspect, a drilling tool is provided, which comprises:
- a tool holder that extends along a central axis and comprises a first cutting insert receptacle and a second cutting insert receptacle, wherein the first cutting insert receptacle comprises a first abutment surface oriented parallel to the central axis, and wherein the second cutting insert receptacle comprises a second abutment surface oriented parallel to the central axis,
- a first cutting insert that is made of CVD thick film diamond, is connected to the first cutting insert receptacle in a firmly bonded manner, and abuts with one of its sides against the first abutment surface, and
- a second cutting insert that is made of CVD thick film diamond, is connected to the second cutting insert receptacle in a firmly bonded manner, and abuts with one of its sides against the second abutment surface,
- wherein an axial portion of the first cutting insert projects axially beyond an end face end of the tool holder, and wherein the first cutting insert comprises in the axial portion a first main cutting edge that is inclined with respect to a first imaginary plane, which is oriented orthogonally to the central axis and arranged at the end face end of the tool holder,
- wherein a radially outer end of the first main cutting edge is spaced a larger distance from the first imaginary plane than a radially inner end of the first main cutting edge,
- wherein the first main cutting edge does not intersect the first imaginary plane, and
- wherein the first main cutting edge touches or intersects a second imaginary plane that is spanned by the central axis and oriented orthogonally to the first abutment surface.

According to a second aspect, a drilling tool is provided, which comprises:
- a tool holder that extends along a central axis and comprises a first cutting insert receptacle and a second cutting insert receptacle, wherein the first cutting insert receptacle comprises a first abutment surface oriented parallel to the central axis, and wherein the second cutting insert receptacle comprises a second abutment surface oriented parallel to the central axis,
- a first cutting insert that is fixed in the first cutting insert receptacle and abuts with one of its sides against the first abutment surface, and
- a second cutting insert that is fixed in the second cutting insert receptacle and abuts with one of its sides against the second abutment surface,
- wherein an axial portion of the first cutting insert projects axially beyond an end face end of the tool holder, and wherein the first cutting insert comprises in the axial portion a first main cutting edge that is inclined with respect to a first imaginary plane, which is oriented orthogonally to the central axis and arranged at the end face end of the tool holder,
- wherein a radially outer end of the first main cutting edge is spaced a larger distance from the first imaginary plane than a radially inner end of the first main cutting edge,
- wherein the first main cutting edge does not intersect the first imaginary plane,
- wherein the first main cutting edge touches or intersects a second imaginary plane that is spanned by the central axis and oriented orthogonally to the first abutment surface,
- wherein a radial portion of the first cutting insert projects beyond an outer circumference of the tool holder, and wherein the first cutting insert comprises in the radial portion a first minor cutting edge that is parallel to the central axis or inclined with respect to the central axis by a maximum of 2°, wherein the first minor cutting edge is connected to the first main cutting edge via a transition element that comprises at least one of a radius and a chamfer, and wherein the first minor cutting edge is inclined at an angle less than 90° with respect to the first main cutting edge.

The presented drilling tool comprises a cutting edge geometry that is specially adapted for machining materials with very high hardness. The cutting edge geometry includes an inclination of the main cutting edge from outside to inside. The radially outer end of the main cutting edge projects in axial direction (i.e. parallel to the central axis) further beyond the end face end of the tool holder than the radially inner end of the main cutting edge.

With presented the drilling tool, the first cut of the workpiece is therefore not from inside to outside, but from outside to inside. The drilling tool does not necessarily have a central drill tip and thus no convex cutting edge geometry of the drill head, as is otherwise usual in most cases, but has a concave cutting edge geometry of the drill head. This considerably reduces the pressure on the center of the drill head. Thus, it is possible to largely negate the cutting speed in the center of the drill (typically zero).

Two imaginary planes are referred to herein, which imaginary planes only serve to describe the geometry and position of the main cutting edge. The first imaginary plane is oriented orthogonally to the central axis and runs through the end face end of the tool holder or touches the end face end of the tool holder. It represents a kind of vertical plane or yz-plane. In relation to this first imaginary plane, the main cutting edge of the cutting insert, which is herein referred to as the first main cutting edge, is inclined in such a way that the radially outer end of the first main cutting edge is spaced a larger distance from the first imaginary plane than a radially inner end of the first main cutting edge. However, the first main cutting edge is entirely on one side of this first imaginary plane, while the tool holder is entirely on the opposite side of this first imaginary plane.

The second imaginary plane describing the geometry and position of the first main cutting edge is spanned by the central axis of the tool holder and is orthogonal to the first abutment surface. The central axis of the tool holder therefore lies in this second imaginary plane. The first main cutting edge touches or intersects this second imaginary plane. The first main cutting edge thus cuts up to the center or beyond the center of the drill head, so that despite the concave cutting edge geometry, machining is also performed in the center of the drill head and no material is left standing in the center of the drill hole.

Due to the cutting edge geometry of the first main cutting edge, machining starts at the radially outer end of the drill head when the drilling tool is placed on a workpiece. This leads to increased stability as well as high axial accuracy and roundness in the bore.

The first cutting insert is preferably made of CVD thick film diamond. By the mentioned geometry and position of the first main cutting edge, it has been possible to use the high wear resistance of the CVD thick film diamond in such a way that the excellent properties of the CVD thick film diamond against friction are utilized and at the same time the properties against breakage are protected. Thus, it is possible to machine very hard materials with geometrically defined cutting edges efficiently and with low stress.

According to a refinement, the first abutment surface is oriented parallel to a radial direction of the tool holder that is orthogonal to the central axis.

The first abutment surface is thus parallel to both the central axis and the radial direction. In other words, the first abutment surface is orthogonal to the first and second imaginary plane. According to this refinement, the power transmission between the tool holder and the first cutting insert is therefore in the circumferential direction, orthogonal to the radial direction and the central axis.

According to another refinement, the first main cutting edge is oriented parallel to the first abutment surface. With respect to the radial direction or the first imaginary plane, the first main cutting edge is preferably inclined at an angle of 0.2° to 3°.

As already mentioned, the first main cutting edge is inclined from radially outside to radially inside, resulting in a concave cutting edge geometry. When machining a workpiece, the cutting pressure, which is initially radially outside, is thus slowly transferred to the first cutting insert from outside to inside along the first main cutting edge, so that the total load of the first main cutting edge is delayed. This stabilizes the cutting pressure and avoids chunking at the first main cutting edge.

According to another refinement, a length of the first main cutting edge is larger than half a diameter of the tool holder.

In this refinement, the first main cutting edge preferably cuts from the very outside to the inside over the center of the drilling tool. In this case, the drilling tool can be configured as a single cutter with only one cutting insert and one main cutting edge, namely the first cutting insert with the first main cutting edge.

In the latter refinement, a radial portion of the first cutting insert preferably projects beyond an outer circumference of the tool holder and the first cutting insert comprises in the radial portion a first minor cutting edge that is parallel to the central axis or inclined with respect to the central axis by a maximum of 2°.

This first minor cutting edge is spaced a larger distance from the central axis than the radially outer end of the first main cutting edge. The first minor cutting edge serves as a kind of support with which the drilling tool is supported on the workpiece on the circumference. Thus, it serves mainly as a guide. At the same time, however, material is also removed at this point. If the first minor cutting edge is slightly inclined with respect to the central axis of the drilling tool, this guarantees better freewheeling, since the first minor cutting edge then for the most part no longer contacts the workpiece to be machined and therefore less friction between the first cutting insert and the workpiece occurs at this point.

According to another refinement, the first minor cutting edge is connected to the first main cutting edge by a radius and/or a chamfer.

The radius and/or the chamfer form the cutting edge corner and thus the point where the first cut of the workpiece begins. The radius and/or the chamfer thus contribute to cutting. It is therefore a kind of corner cutting edge.

According to another refinement, the first minor cutting edge is inclined at an angle of less than 90° with respect to the first main cutting edge.

The angle of <90° already results from the fact that the first main cutting edge, as already mentioned, is inclined inwards at an angle with respect to the radial direction and at the same time the first minor cutting edge is inclined with respect to the central axis.

According to another refinement, the tool holder comprises a second cutting insert receptacle having a second abutment surface oriented parallel to the central axis, and wherein a second cutting insert is fixed in the second cutting insert receptacle, which second cutting insert abuts with one of its sides against the second abutment surface.

The tool can therefore also be configured as a two- or multi-cutter. The second abutment surface, against which the second cutting insert abuts, is preferably arranged parallel offset to the first abutment surface. The offset of the two abutment surfaces is preferably realized in such a way that there is a maximum gap of 6 hundredths between the first main cutting edge of the first cutting insert and the second main cutting edge of the second cutting insert. This cutting edge gap can also be set to 0. However, the two main cutting edges of the two cutting inserts do not overlap each other.

Depending on the number of cutting inserts, the main cutting edges of the different cutting inserts preferably machine different radial segments of the bore. When using two cutting inserts, it is preferred that the first main cutting edge of the first cutting insert machines the bore from the very outside to beyond the center of the bore, whereas the second main cutting edge of the second cutting insert machines only the radially outer area of the bore. Thus, in the radially inner or central area of the bore, only the first cutting insert cuts, whereas in the radially outer area, the bore is machined by both the first and the second cutting insert.

According to a refinement, an axial portion of the second cutting insert projects beyond the end face end of the tool holder and the second cutting insert comprises in the axial portion a second main cutting edge that is inclined with respect to the first imaginary plane in such a way that a radially outer end of the second main cutting edge is spaced a larger distance from the first imaginary plane than a radially inner end of the second main cutting edge and the second main cutting edge does not intersect the first imaginary plane. The second main cutting edge of the second cutting insert is therefore inclined from outside to inside, just like the first main cutting edge of the first cutting insert.

According to another refinement, the first main cutting edge is inclined at a first angle with respect to the first imaginary plane, whereas the second main cutting edge is inclined at a second angle different from the first angle with respect to the first imaginary plane.

Since both main cutting edges are preferably inclined from outside to inside, a concave cutting edge geometry results. In a side view orthogonal to the two abutment surfaces of the cutting inserts, the first and second main cutting edges preferably enclose an angle that is smaller than 180° but larger than 174°. The minimum angle of 174° would result from an inclination of both main cutting edges of 3° with respect to the first imaginary plane.

Preferably, a dimension of the second cutting insert measured in the radial direction, i.e. orthogonal to the central axis, is smaller than a dimension of the first cutting insert measured in the radial direction.

While the first main cutting edge preferably machines the bore from the very outside inwards to beyond the center, the second main cutting edge preferably machines only the radially outer edge of the bore. The second main cutting edge therefore does not extend to the center of the tool holder or even beyond it. In other words, the second main cutting edge does not intersect or touch the second imaginary plane.

However, according to a refinement, it is also possible that the second main cutting edge projects beyond an outer circumference of the tool holder, but the first cutting insert does not. In such a configuration, the radially outer edge of the bore would be machined only by the second cutting insert and the radially inner edge of the bore would be machined only by the first cutting insert.

Regardless of whether only the second cutting insert projects beyond the outer circumference of the tool holder or both cutting inserts project beyond the outer circumference of the tool holder, the second cutting insert has a radial portion that extends beyond an outer circumference of the tool holder, wherein the second cutting insert comprises in the radial portion a second minor cutting edge that is parallel to the central axis or inclined with respect to the central axis by a maximum of 2°.

Similar as the first cutting insert, the second minor cutting edge is connected to the second main cutting edge by a radius and/or a chamfer.

Preferably, the drilling tool is designed neither rotationally-symmetrical nor mirror-symmetrical.

According to a refinement, the cutting inserts are each connected to the tool holder in a firmly bonded manner. This guarantees a stable connection of the cutting inserts with the tool holder.

Preferably, the cutting inserts are soldered to the tool holder. Although a welded connection would also be possible in principle, a soldered connection is advantageous in the present case, since the cutting inserts are preferably made of CVD thick film diamond and the tool holder is preferably made of cemented carbide.

It goes without saying that the features mentioned above and the features to be explained below can be used not only in the combination indicated in each case, but also in other combinations or on their own, without leaving the spirit and scope of the present disclosure.

DESCRIPTION OF PREFERRED EMBODIMENTS

Figure 1:
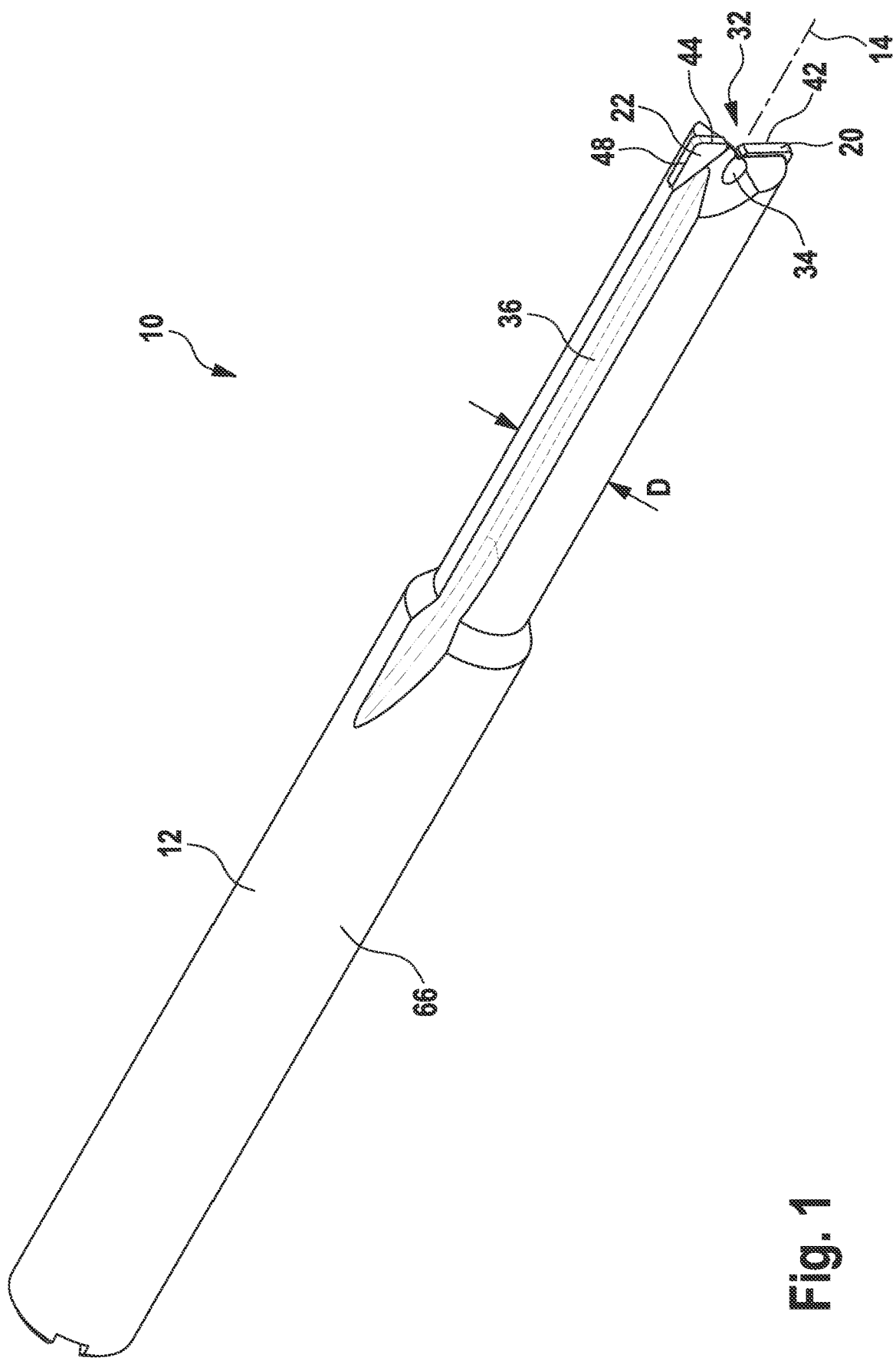
FIG. 1 shows a perspective view of a drilling tool according to a first embodiment.

FIG. 1 shows a perspective view of a first embodiment of the drilling tool. The drilling tool is therein denoted in its entirety with the reference numeral 10.

The drilling tool 10 is preferably designed neither rotationally-symmetrical nor mirror-symmetrical.

The drilling tool 10 comprises a tool holder 12 that extends along a central axis 14. In the area of its end face end, the tool holder 12 in the herein shown embodiment comprises two cutting insert receptacles 16, 18, which are referred to as first cutting insert receptacle 16 and second cutting insert receptacle 18 for better differentiation. The two cutting insert receptacles 16, 18 are used to receive two cutting inserts 20, 22, which are referred to as first cutting insert 20 and second cutting insert 22.

The two cutting inserts 20, 22 are differently sized in the shown embodiment. In addition to their size difference, the two cutting inserts 20, 22 in the present embodiment do also not have exactly the same geometry.

Although the drilling tool 10 in the shown embodiment is provided with two cutting inserts 20, 22, it should be noted at this point that only one of the two cutting inserts, namely cutting insert 20, would be sufficient for the function of the drilling tool 10. The drilling tool 10 could just as well be provided with more than two cutting inserts without leaving the spirit and scope of the present disclosure.

Figure 3:
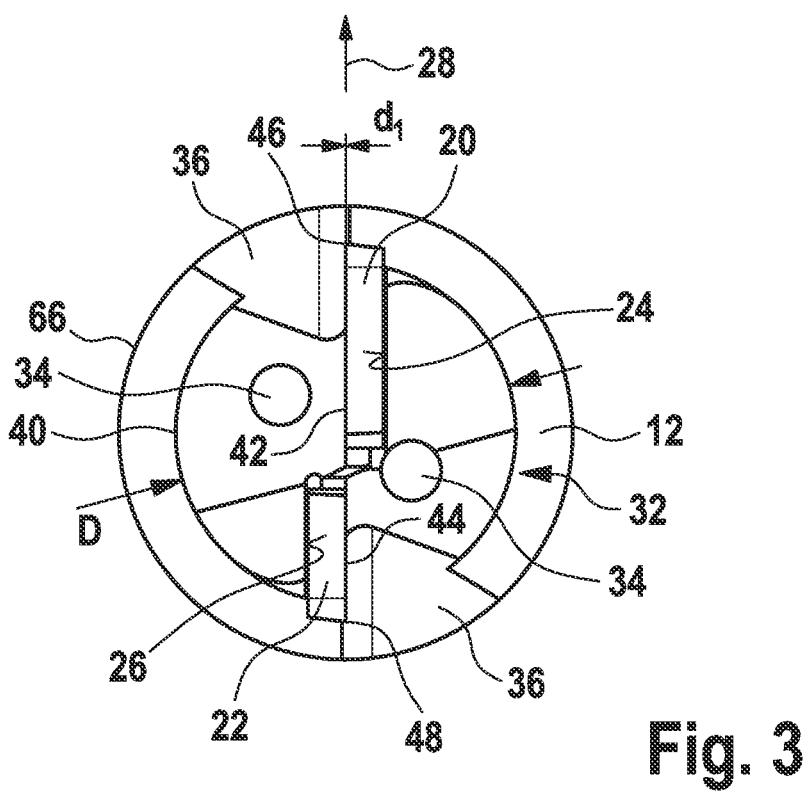
FIG. 3 shows a top view from the front of the drill head of the drilling tool from FIG. 1.
Figure 4:
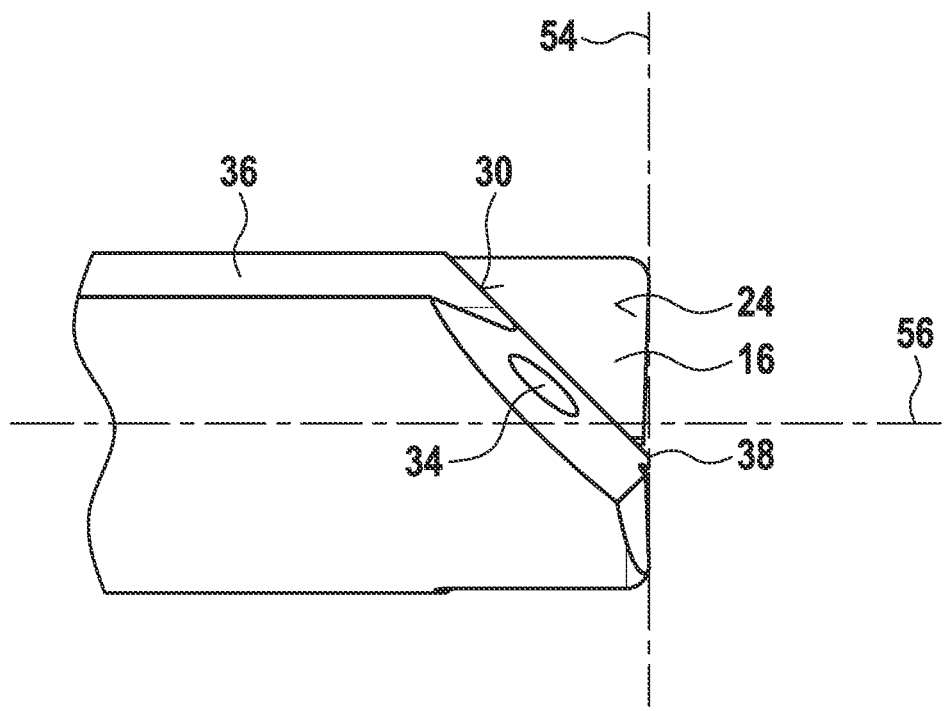
FIG. 4 shows the drill head of the drilling tool from FIG. 1 in a side view without cutting inserts attached to it.
Figure 5:
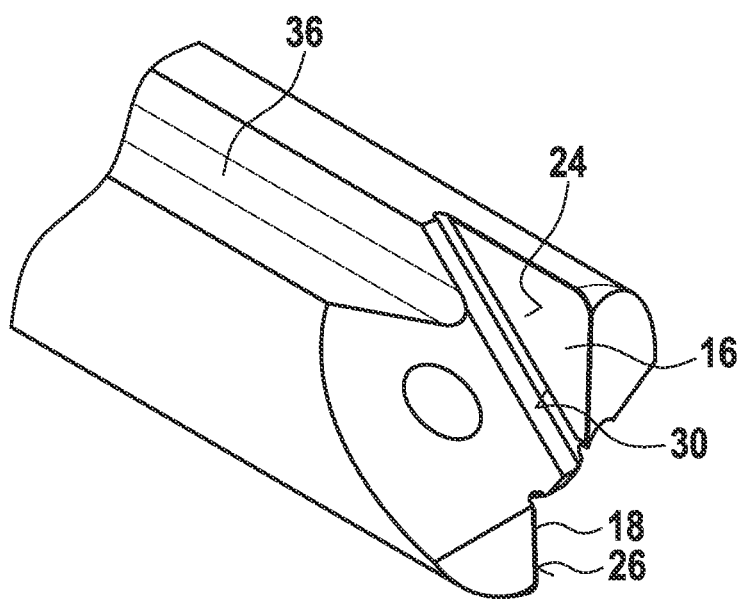
FIG. 5 shows the drill head of the drilling tool from FIG. 1 in a perspective view without cutting inserts attached to it.

The cutting insert receptacles 16, 18, in which the cutting inserts 20, 22 are arranged, are shown in detail in FIGS. 4 and 5, since the cutting inserts 20, 22 are not shown here. Both cutting insert receptacles 16, 18 comprise an abutment surface 24 and 26, respectively, on which the two cutting inserts 20, 22 rest flat (see also FIG. 3). These two abutment surfaces 24, 26, which are referred to as first abutment surface 24 and second abutment surface 26, preferably run parallel to the central axis 14 of the tool holder 12. Similarly preferably, the two abutment surfaces 24, 26 run parallel to each other and parallel to a radial direction 28 of the tool holder 12. The radial direction 28, which is orthogonal to the central axis 14, is simply shown with an arrow in FIG. 3.

Each of the two cutting inserts 20, 22 has a side surface that additionally rests on another support surface on the tool holder 12. In FIGS. 4 and 5, said support surface on which the first cutting insert 20 rests is denoted with the reference numeral 30. The corresponding support surface of the second cutting insert receptacle 18, on which the second cutting insert 22 is supported, is hidden in FIGS. 4 and 5 and not explicitly shown. However, like the support surface 30, it runs at an acute angle (angle<90°) to the central axis 14 of the tool holder 12.

The two cutting inserts 20, 22 are connected to the tool holder 12, or more precisely to the cutting insert receptacles 16, 18, preferably in a firmly bonded manner. The two cutting inserts 20, 22 are particularly preferably soldered to the cutting insert receptacles 16, 18. The cutting inserts 20, 22 are preferably made of CVD thick-film diamond. The tool holder 12 is preferably made of cemented carbide.

Figure 2:
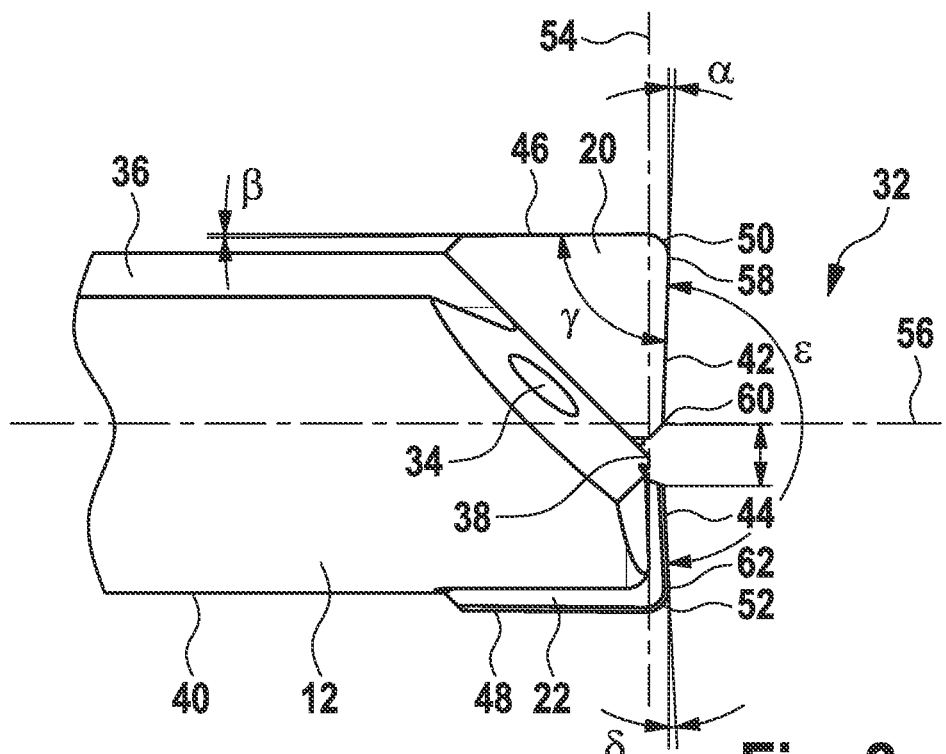
FIG. 2 shows a detail of a drill head of the drilling tool from FIG. 1 in a side view.

Together with the front part of the tool holder 12 to which they are attached, the cutting inserts 20, 22 form a drill head 32, which is shown in detail in FIGS. 2 and 3 in a side view (FIG. 2) and in a top view from the front (FIG. 3). In the herein shown embodiment, two outlets 34 of two coolant channels provided in the tool holder 12 are arranged on this drill head 32. These coolant channels can be used to transport cooled air in the area of the drill head 32, for example, in order to cool the inserts 20, 22 during the cutting process. Instead of air, of course, any other coolant can also be transported through the coolant channels to the coolant outlets 34.

The chips removed from the workpiece are transported via chip grooves 36, which extend from the drill head 32 along the tool holder 12 to the rear. In the herein shown embodiment, the drilling tool 10 comprises two such chip grooves 36, wherein one of the chip grooves 36 is assigned to the first cutting insert 20 and the other one of the two chip grooves 36 is assigned to the second cutting insert 22.

In the first embodiment shown in FIGS. 1-3, the two cutting inserts 20, 22 project outwards both in the axial direction (i.e. along the central axis 14) over an end face end 38 of the tool holder 12 and transversely thereto, in the radial direction 28 over an outer circumference 40 of the drill head 32.

Each of the two cutting inserts 20, 22 comprises a main cutting edge 42, 44 and a minor cutting edge 46, 48. The main cutting edges 42, 44 are arranged in the axial portion of the cutting inserts 20, 22, which projects beyond the end face end 38 of the tool holder 12. The minor cutting edges 46, 48 are arranged in the radial portion that projects over the outer circumference 40 of the drill head 32.

The main cutting edge 42 of the first cutting insert 20 is herein referred to as the first main cutting edge 42. The main cutting edge 44 of the second cutting insert 22 is herein referred to as the second main cutting edge 44. Accordingly, the minor cutting edge 46 of the first cutting insert 20 is referred to as first minor cutting edge and the minor cutting edge 48 of the second cutting insert 22 is referred to as second minor cutting edge 48.

The first main cutting edge 42 is connected to the first minor cutting edge 46 by a corner cutting edge 50, which can be configured as a chamfer and/or a radius. The second main cutting edge 44 is connected to the second minor cutting edge 48 by a second corner cutting edge 52, which can also be configured as a chamfer and/or a radius. These two corner cutting edges 50, 52 preferably form the portion of the respective cutting insert 20, 22 which has the largest distance from the central axis 14 of the tool holder 12.

If the corner cutting edges 50, 52 are configured as radii, they preferably have a radius in the range of 0.1-1 mm. If the corner cutting edges 50, 52 are configured as chamfers, they are preferably inclined at an angle of 5°-20° relative to the adjacent main cutting edges 42, 44 and have a length in the range of 0.2-1 mm.

To describe the position and geometry of the main and minor cutting edges 42, 44, 46, 48, reference is made to two imaginary planes, which only serve for a better description. The two imaginary planes are shown as dashed lines in FIG. 2 and FIG. 4 and denoted with reference numerals 54, 56. The two imaginary planes 54, 56 are two planes that are oriented orthogonally to one another. The imaginary plane 54, which is herein referred to as the first imaginary plane 54, is oriented orthogonally to the central axis 14 of the tool holder 12 and runs through the end face end 38 of the tool holder 12. The imaginary plane 56, which is herein referred to as the second imaginary plane 56, is oriented orthogonally to it. The central axis 14 of the tool holder 12 is arranged in this second imaginary plane 56. Both imaginary planes 54, 56 preferably run orthogonally to the two abutment surfaces 24, 26 of the cutting insert receptacles 16, 18. In other words, the first imaginary plane 54 forms the radial plane that runs through the end face end 38 of the tool holder 12. The second imaginary plane 56, on the other hand, is spanned by the radial direction 28 and the central axis 14.

The first main cutting edge 42 of the first cutting insert 20 is inclined with respect to the first imaginary plane 54 in such a way that a radially outer end 58 of the first main cutting edge 42, which is adjacent to the first corner cutting edge 50, has a larger distance from the first imaginary plane 54 than a radially inner end 60 of the first main cutting edge 42. However, both ends 58, 60 of the first main cutting edge 42 are located on the same side of the first imaginary plane 54, namely on the side of the first imaginary plane 54 facing away from the tool holder 12. The first main cutting edge 42 does therefore not intersect the first imaginary plane 54.

The described arrangement results in an inclination of the main cutting edge 42 with respect to the first imaginary plane 54 or with respect to the radial direction 28. This inclination is illustrated in FIG. 2 by the angle α. The angle α is preferably 0.2°-3°. The first main cutting edge 42 touches or intersects the second imaginary plane 56. In other words, the first main cutting edge 42 extends to the center of the drilling tool 10 (if it touches the second imaginary plane 56) or extends beyond the center of the drilling tool 10 (if it intersects the second imaginary plane 56).

The first minor cutting edge 46 of the first cutting insert 20 preferably runs parallel to the central axis 14 of the tool holder 12 or is inclined at an angle of maximum 2° with respect to the central axis 14 of the tool holder 12. This angle is denoted as angle β in FIG. 2.

The inclination of the first main cutting edge with respect to the radial direction 28 (angle α) and the optional inclination of the first minor cutting edge 46 with respect to the central axis 14 (angle β) results in an angle γ between the first main cutting edge 42 and the first minor cutting edge 46, which is preferably smaller than 90°. This angle γ is particularly preferably in the range of 85° to 89.8°.

The second main cutting edge 44 of the second cutting insert 22 is also inclined with respect to the first imaginary plane 54. The corresponding inclination angle is denoted as angle δ in FIG. 2. Also the inclination of the second main cutting edge 44 is such that a radially outer end 62 of the second main cutting edge 44 is spaced a larger distance from the first imaginary plane 54 than a radially inner end 64 of the second main cutting edge 44. The second main cutting edge 44 does not intersect the first imaginary plane 54 either.

This results in an angle c between the main cutting edges 42, 44 which is less than 180°, but preferably larger than 174°. Preferably, the angle ε is larger than 174°, but less than 179.6°. All together, the main cutting edges 42, 44 result in a concave cutting edge geometry at the axial end face end of the drill head 32.

Unlike the first main cutting edge 42 of the first cutting insert 20, the second main cutting edge 44 of the second cutting insert 22 does not extend up to the center of the drilling tool 10. The second main cutting edge 44 does therefore not touch or intersect the second imaginary plane 56.

In the embodiment shown in FIGS. 1-3, the second minor cutting edge 48 of the second cutting insert 22 runs parallel to the central axis 14 of the tool holder 12. However, just like the first minor cutting edge 46, it can be inclined with respect to the central axis 14 by a maximum of 2°. Despite the described inclinations of the main and minor cutting edges 42, 44, 46, 48 by the angles α, β and δ the main and minor cutting edges 42, 44, 46, 48 preferably run parallel to the two abutment surfaces 24, 26 of the cutting insert receptacles 16, 18. The main and minor cutting edges 42, 44, 46, 48 are preferably all configured as straight cutting edges.

When machining a workpiece with the drilling tool 10, the corner cutting edges 50, 52 first come into contact with the workpiece due to the described inclination of the main cutting edges 42, 44. The drill head 32 therefore supports itself on the workpiece with these two corner cutting edges 50, 52. Due to the described inclination of the main cutting edges 42, 44 with respect to the radial direction 28, the first cut runs from outside to inside. This increases the wear resistance of the cutting inserts 20, 22 enormously, since the cutting pressure is slowly transferred from the outside to the inside of the cutting edge geometry, thus delaying the total load. This stabilizes the cutting pressure so that breakouts at the main cutting edges 42, 44 can be avoided. The design of the cutting inserts 20, 22 as CVD thick-film diamond cutting inserts results in a drilling tool with high-strength cutting edges, which enables a machining of very hard materials such as sintered carbide or ceramics. The pressure on the center of the drilling tool 10 is considerably reduced by the described inclination of the main cutting edges 42, 44. Due to the developed cutting edge geometry it is possible to negate to a large extent the cutting speed in the center of the drill, which is typically 0. The support in the corners 50, 52 leads to an increased stability and thus to highest axial accuracy and roundness in the bore. The inclination of the minor cutting edges 46, 48 minimizes the friction on the lateral surface of the bore.

In order to be able to guarantee the high-precision properties of the drilling tool 10, it is further preferred that the cutting edge geometry or the cutting edges 42, 44, 46, 48 are produced by laser processing.

The top view from the front shown in FIG. 3 further shows the following: the two cutting inserts 20, 22 preferably have different sizes. The first cutting insert 20 is larger than the second cutting insert 22, especially with respect to its radial extension. Preferably, the first cutting insert 20 has an extension in radial direction 28 that is larger than half the diameter of the tool holder 12. This diameter, which is denoted as diameter D in FIGS. 1 and 3, refers to the diameter of the drill head 32. In the rear part, the tool holder 12 comprises a clamping section 66, the diameter of which is preferably larger than the diameter D. Since, as already mentioned, the first main cutting edge 42 of the first cutting insert 20 cuts from the very outside to the center or beyond, the first main cutting edge 44 also has a length that is larger than half the diameter D of the drill head 32.

In the top view from the front shown in FIG. 3, a distance d1 is also drawn, which is between the two main cutting edges 42, 44. This distance d1 should not exceed 6 hundredths. However, the distance d1 can also be 0.

Figure 6:
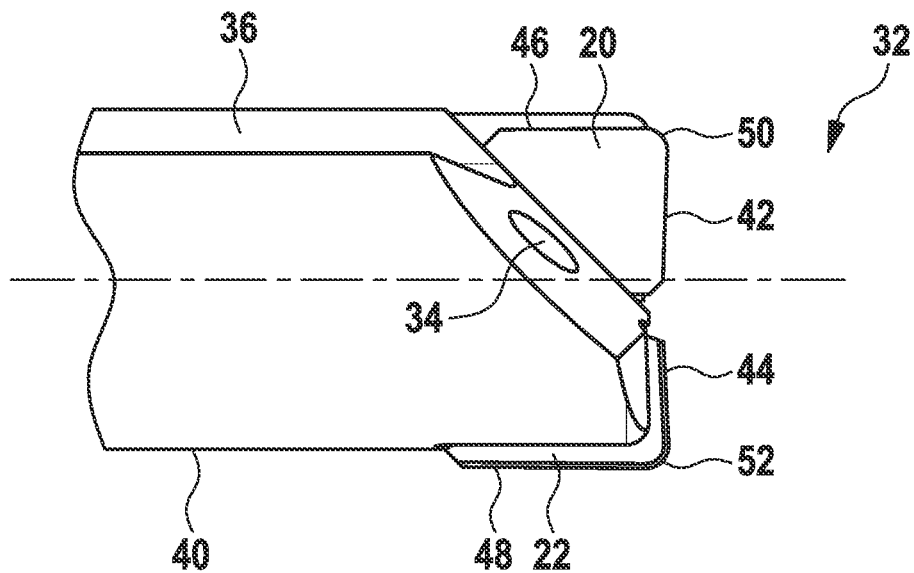
FIG. 6 shows a drill head of the drilling tool according to a second embodiment in a side view.
Figure 7:
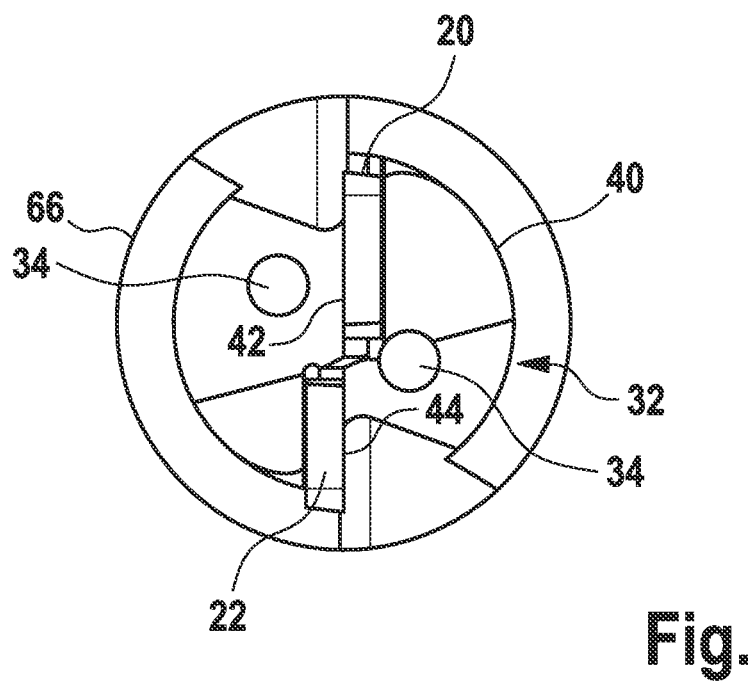
FIG. 7 shows the drill head from FIG. 6 in a top view from the front.

FIGS. 6 and 7 show a second embodiment of the drilling tool 10, in which only the second cutting insert 22 projects radially outwards beyond the outer circumference 40 of the tool holder 12 in the area of the drill head 32. In contrast, the first minor cutting edge 46 of the first cutting insert 20 is arranged inside the tool holder 12 without protruding radially outwards beyond the outer circumference 40 of the tool holder 12 in the area of the drill head 32. However, the inclinations of the main and minor cutting edges 42, 44, 46, 48 do not differ from the first embodiment. The main difference to the first embodiment is therefore that with the drilling tool 10 shown in FIGS. 6 and 7, the outer contour of the bore is machined only with the second cutting insert 22 and the center of the bore is machined with the first cutting insert 20 only. Between this outer and inner area, the bore is machined with both cutting inserts 20, 22, as in the first embodiment.

It would also be conceivable to provide more than two cutting inserts, wherein the main cutting edges of each cutting insert machine a radial segment of the bore from outside to inside. However, if the first cutting insert 20 is configured as shown in the first embodiment in FIGS. 1-3, it is sufficient to use only one cutting insert 20, since in the first embodiment, the cutting insert 20 machines the entire contour from the very outside to the center.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A drilling tool comprising:
a tool holder that extends along a central axis and comprises a first cutting insert receptacle and a second cutting insert receptacle, wherein the first cutting insert receptacle comprises a first abutment surface oriented parallel to the central axis, and
wherein the second cutting insert receptacle comprises a second abutment surface oriented parallel to the central axis,
a first cutting insert that is connected to the first cutting insert receptacle, and abuts with one of its sides against the first abutment surface, and
a second cutting insert that is connected to the second cutting insert receptacle, and abuts with one of its sides against the second abutment surface,
wherein an axial portion of the first cutting insert projects axially beyond an end face end of the tool holder, and wherein the first cutting insert comprises in the axial portion a first main cutting edge that is inclined with respect to a first imaginary plane, which is oriented orthogonally to the central axis and arranged at the end face end of the tool holder, and the first main cutting edge is oriented parallel to the first abutment surface,
wherein a radially outer end of the first main cutting edge is spaced a larger distance from the first imaginary plane than a radially inner end of the first main cutting edge,
wherein the first main cutting edge does not intersect the first imaginary plane,
wherein the first main cutting edge is completely straight between the radially outer end and the radially inner end, and the first main cutting edge at the radially inner end ends on or extends past a second imaginary plane that is spanned by the central axis and oriented orthogonally to the first abutment surface, and
wherein a length of the first main cutting edge is larger than half a diameter of a portion of the tool holder adjacent to the first cutting insert, and a radial outer portion of the first cutting insert projects beyond an outer circumference of the portion of the tool holder.

2. The drilling tool according to claim 1, wherein the first abutment surface is oriented parallel to a radial direction of the tool holder that is orthogonal to the central axis.

3. The drilling tool according to claim 1, wherein the first main cutting edge is oriented parallel to the first abutment surface.

4. The drilling tool according to claim 1, wherein the first main cutting edge is inclined at an angle of 0.2° to 3° with respect to the first imaginary plane.

5. The drilling tool according to claim 1, wherein the first cutting insert comprises in the radial outer portion a first minor cutting edge that is parallel to the central axis or inclined with respect to the central axis by a maximum of 2°.

6. The drilling tool according to claim 5, wherein the first minor cutting edge is connected to the first main cutting edge via a transition element that comprises at least one of a radius and a chamfer.

7. The drilling tool according to claim 5, wherein the first minor cutting edge is inclined at an angle less than 90° with respect to the first main cutting edge.

8. The drilling tool according to claim 1, wherein the second abutment surface is arranged parallel and offset to the first abutment surface.

9. The drilling tool according to claim 1, wherein an axial portion of the second cutting insert projects beyond the end face end of the tool holder, and wherein the second cutting insert comprises in the axial portion a second main cutting edge that is inclined with respect to the first imaginary plane in such a way that a radially outer end of the second main cutting edge is spaced a larger distance from the first imaginary plane than a radially inner end of the second main cutting edge and the second main cutting edge does not intersect the first imaginary plane.

10. The drilling tool according to claim 9, wherein the first main cutting edge is inclined at a first angle with respect to the first imaginary plane, and wherein the second main cutting edge is inclined at a second angle with respect to the first imaginary plane, the second angel being different from the first angle.

11. The drilling tool according to claim 10, wherein the first and second main cutting edges enclose an angle that is smaller than 180° but larger than 174°.

12. The drilling tool according to claim 1, wherein a dimension of the second cutting insert measured in a radial direction, that is orthogonal to the central axis, is smaller than a dimension of the first cutting insert measured in the radial direction.

13. The drilling tool according to claim 9, wherein the second main cutting edge neither touches nor intersects the second imaginary plane.

14. The drilling tool according to claim 1, wherein the second cutting insert projects beyond an outer circumference of the tool holder.

15. The drilling tool according to claim 1, wherein the drilling tool is neither rotationally-symmetrical nor mirror-symmetrical.

16. A drilling tool comprising:
a tool holder that extends along a central axis and comprises a first cutting insert receptacle and a second cutting insert receptacle, wherein the first cutting insert receptacle comprises a first abutment surface oriented parallel to the central axis, and
wherein the second cutting insert receptacle comprises a second abutment surface oriented parallel to the central axis,
a first cutting insert that is fixed in the first cutting insert receptacle and abuts with one of its sides against the first abutment surface, and
a second cutting insert that is fixed in the second cutting insert receptacle and abuts with one of its sides against the second abutment surface,
wherein an axial portion of the first cutting insert projects axially beyond an end face end of the tool holder, and wherein the first cutting insert comprises in the axial portion a first main cutting edge that is inclined with respect to a first imaginary plane, which is oriented orthogonally to the central axis and arranged at the end face end of the tool holder, and the first main cutting edge is oriented parallel to the first abutment surface, wherein a radially outer end of the first main cutting edge is spaced a larger distance from the first imaginary plane than a radially inner end of the first main cutting edge, wherein the first main cutting edge does not intersect the first imaginary plane, wherein the first main cutting edge is completely straight between the radially outer end and the radially inner end, and the first main cutting edge at the radially inner end ends on or extends past a second imaginary plane that is spanned by the central axis and oriented orthogonally to the first abutment surface, wherein a length of the first main cutting edge is larger than half a diameter of the tool holder, and a radial portion of the first cutting insert projects beyond an outer circumference of the tool holder, and wherein the first cutting insert comprises in the radial portion a first minor cutting edge that is parallel to the central axis or inclined with respect to the central axis by a maximum of 2°, wherein the first minor cutting edge is connected to the first main cutting edge via a transition element that comprises at least one of a radius and a chamfer, and wherein the first minor cutting edge is inclined at an angle less than 90° with respect to the first main cutting edge.

17. The drilling tool according to claim 16, wherein the first cutting insert is made of CVD diamond.

18. The drilling tool according to claim 16, wherein the first cutting insert is connected to the first cutting insert receptacle.

19. The drilling tool according to claim 16, wherein the second cutting insert projects beyond an outer circumference of the tool holder.

* * * * *